[11] 3,627,427

| [72] | Inventors | Winston O. Johnson<br>Atlanta;<br>Donald M. Meadows, Marietta, both of Ga. |
|---|---|---|
| [21] | Appl. No. | 10,520 |
| [22] | Filed | Feb. 11, 1970 |
| [45] | Patented | Dec. 14, 1971 |
| [73] | Assignee | Lockheed Aircraft Corporation<br>Burbank, Calif. |

[54] METHOD AND APPARATUS FOR CONTOUR MEASUREMENT
17 Claims, 5 Drawing Figs.

[52] U.S. Cl. .................................................. 356/120, 350/162, 356/170
[51] Int. Cl. .................................................. G01b 11/24, G01b 11/30
[50] Field of Search .......................... 350/162; 356/170, 169, 120; 250/237 G

[56] References Cited
UNITED STATES PATENTS

| 1,590,532 | 6/1926 | Lenouvel .................... | 350/162 |
| 2,867,149 | 1/1959 | Goddard ..................... | 356/120 |
| 3,244,895 | 4/1966 | Anderegg, Jr. ............... | 356/170 |
| 3,396,627 | 8/1968 | Rouy et al .................... | 356/120 |

FOREIGN PATENTS

| 29,803 | 1964 | Germany ..................... | 356/170 |
| 398,097 | 1966 | Switzerland ................. | 356/169 |

Primary Examiner—Ronald L. Wibert
Assistant Examiner—J. Rothenberg
Attorneys—Roger T. Frost and George C. Sullivan ABSTRACT: A technique for measuring the contour of a surface by generating a pattern of optical interference between a periodic shadow pattern cast onto the surface and a periodic reference pattern. Translating the shadow pattern and the reference pattern at least one complete cycle of spatial frequency causes the average intensity of the shadow pattern, the reference grid pattern, and various extraneous optical noise images to be minimized or cancelled, so that only contour lines accurately describing the contour of the surface remain on the surface to be viewed or photographed.

PATENTED DEC 14 1971

INVENTORS.
WINSTON O. JOHNSON
DONALD M. MEADOWS
BY George Sullivan
Agent
Roger J. Frost
Attorney

PATENTED DEC 14 1971

GRID PHASE POSITIONS

INVENTORS.
WINSTON O. JOHNSON
DONALD M. MEADOWS

BY George C Sullivan
Agent

Roger T. Frost
Attorney

METHOD AND APPARATUS FOR CONTOUR MEASUREMENT

This invention relates in general to contour measurement and, in particular, to a method and apparatus using optical pattern interference techniques for measuring the contour of a surface while eliminating or minimizing unwanted optical interference images.

Surface contour information frequently is needed for many purposes and in many fields. For example, a small-scale model of an automobile must be recreated in a different scale for the development of production tooling and for other purposes. Similarly, the designer of an airplane or a boat who has tested a model design in a wind tunnel or a water tank and who must now build a corresponding model craft to a different scale knows the importance of accurately reproducing the contours of the model in the new vehicle. Terrain mapping, comparison testing of manufactured parts, and measurement of the human body are but a few other examples of the need for obtaining contour information of complex and frequently nonplanar surface contours.

Various prior art techniques have been proposed for providing information on the contour of a surface. Such prior art techniques generally require that the contour of the surface be measured by a point-by-point process at a number of different surface locations. Stereoscopic photography or a suitable surface-contacting probe may be used to provide this height data. The data points then can be used to construct another model or to produce a contour map wherein isogram lines connect areas of equal elevation or height with respect to a datum plane. The time required in such prior art techniques to reduce the measured data or stereo pictures to the form of a contour map is expensive and prevents real-time measurement of the contour of a surface which is subjected to dynamic loading.

An optical contour-measuring method and apparatus has been developed as an alternative to the foregoing techniques. This optical contour-measuring system, which is described in copending application Ser. No. 792,346, entitled "Method and Apparatus for Contour Measurement," filed Jan. 21, 1969 and having the same assignee as the present invention, enables bright and dark moire fringes to be observed on a surface. The respective fringes or lines of brightness and darkness represent regions of equal elevation or height with respect to a datum plane if certain geometrical considerations are observed. In general, this direct optical contour-measuring technique is accomplished by applying a periodically repetitive image to the surface being evaluated, as by projecting an image of a grid or Ronchi ruling onto the surface or by interposing between a source of illumination and the surface and transparent member having gridlines disposed thereon. The elevation-modulated periodic image thus occurring on the surface is placed in interference with another periodic image in such a way that interference patterns known as moire fringes are formed. These moire fringes represent locations of uniform spatial phase shift between the aforementioned periodic images and, if certain geometric requirements are met, also represent locations of uniform elevation of the surface being evaluated. The moire fringes appear on the surface as lines similar to the isogram lines of a conventional contour map, and these moire fringe lines can be viewed by the unaided eye and photographed. However, such view or photograph not only includes the desired contour-indicating fringe lines but additionally includes portions of the repetitive image which was projected or cast onto the surface, typically consisting of parallel shadow lines, portions of the image of the periodic structure which causes the optical interference with the shadow lines, and extraneous visual patterns also caused by optical pattern interference between the two periodic images and analogous to "noise" in an electrical system. These unwanted optical patterns tend to mask and obscure the contour-indicating fringe lines, thus reducing the elevational resolution capability of the direct optical contour-measuring system described in the above-referenced application.

Accordingly, it is an object of this invention to provide an improved method and apparatus for surface contour measurement.

It is another object of this invention to provide a surface contour measurement method and apparatus for generating visual patterns which appear to be present on a surface being examined and which represent contour lines of such surface.

It is still another object of this invention to provide a method and apparatus for surface contour analysis in which interference contour patterns corresponding to contour lines of the surface are generated by optical interference between two periodic image patterns and in which certain extraneous image patterns which obscure the contour patterns are removed.

It is a further object of this invention to provide a method and apparatus for surface contour measurement by optical interference to generate interference patterns of contour lines which contain few or no extraneous noise images and which are continuous and unbroken for a corresponding surface contour.

The exact nature of this invention, as well as other objects and advantages thereof, will be readily apparent from consideration of the following specification relating to the annexed drawings in which.

Stated generally, the contour of a surface is measured by applying a periodically repetitive image onto the surface, such as by directing illumination through a grid structure to direct a shadow image of the grid onto the surface. The periodic shadow image cast on the surface is placed in interference with another periodic image, such as by viewing the surface through the same grid structure or another grid structure having a proper positional and dimensional relationship to the shadow-casting grid. The grids are translationally moved along the grid plane in a direction perpendicular to the gridlines to accomplish partial or complete cancellation of all grid structure image, shadow image, and extraneous optical interference images not arising from contour information in the dimension of elevation being investigated.

Figure 1:
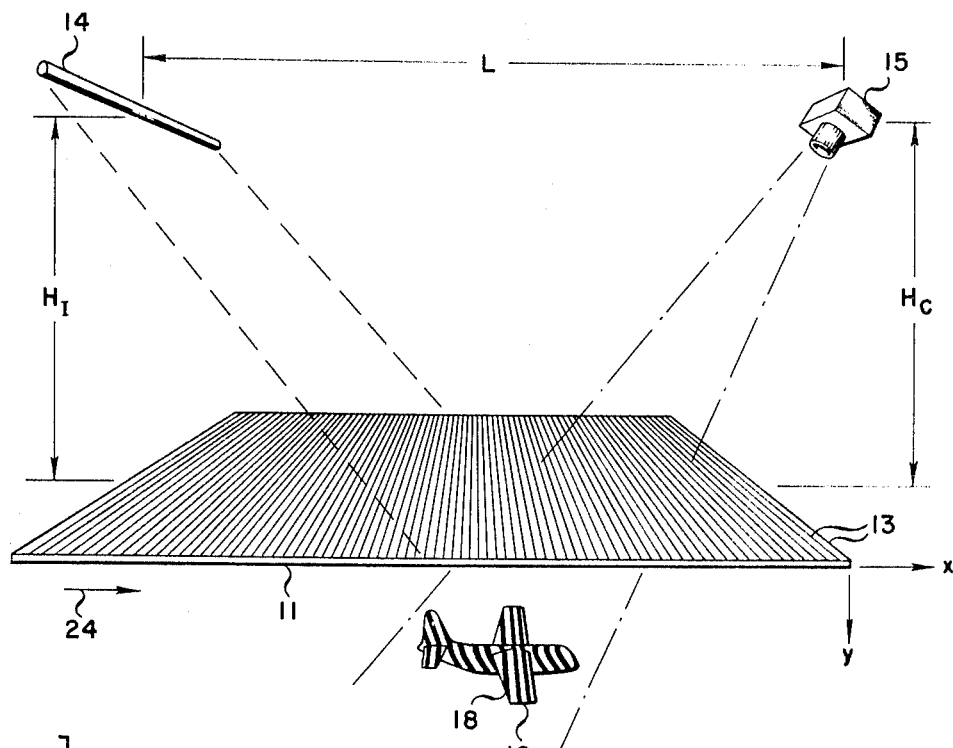
FIG. 1 is a perspective view showing the geometric relationship of a contour measurement grid, an illumination source, and an observation point according to an embodiment of this invention.
Figure 2:
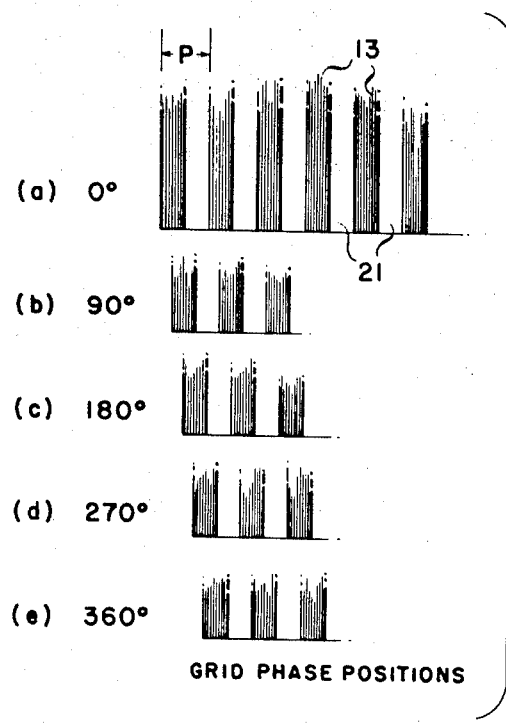
FIG. 2 is a graph illustrating certain ones of the spatial phase shift positions which the grid of FIG. 1 occupies.
Figure 3:
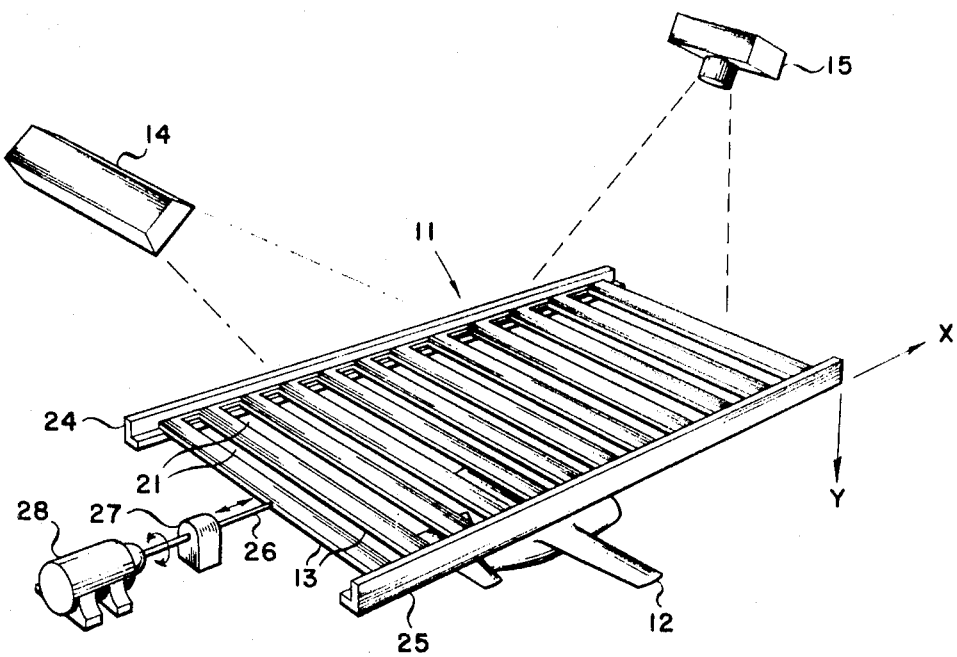
FIG. 3 shows an embodiment of apparatus for accomplishing phase-shifting translation of the contour measurement grid.

Turning now to the figures for a more detailed explanation of the present invention FIG. 1 shows contour-measuring apparatus of the type described in greater detail in the aforementioned application and including a grid 11, disposed adjacent an object 12, the contour of which is to be examined. The grid 11 is characterized by a periodic shadow-casting structure constituting a repetitive pattern of optically distinguishable segments, such as transparent and opaque segments, and preferably can comprise a series of uniformly spaced-apart parallel opaque lines 13 disposed on a transparent member by any suitable technique. The spaces between the opaque lines 13 define a corresponding series of parallel uniform transparent lines 21. The details of the transparent and opaque grid lines are shown in FIGS. 2 and 3. A source 14 of illumination is positioned a distance $H_l$ above the grid 11. For the most effective operation of the embodiment described in FIGS. 1 and 3 hereof, the width or extent of the illumination source 14 as measured in the direction $x$ should be minimized. Accordingly, the illumination source 14 may be of a type known in the art, such as a line or a point source of illumination, producing illumination diverging outwardly from the source. If a line source is used, the source is aligned, as shown in FIGS.

1 and 3, so that the line of illumination is parallel with the lines 13 and 21 of the grid 11.

An observation point 15 on the same side of the grid 11 as the illumination source 14 is defined at a location $H_C$ above the grid and spaced a distance L from the illumination source as measured parallel with the plane occupied by the grid and transverse to the gridlines. This observation point 15 may include the lens of a suitable camera or it may merely be a point where the eye of an observer can view the contour lines appearing on the object 12 as described below.

An object 12 placed in the object space below the grid 11 is covered with a shadow pattern 18 cast by the illumination from the source 14 passing through the grid. The lines of the shadow pattern 18 will, of course, cut across the model 12 at locations determined by the surface contour of the model. Patterns of brightness and darkness are visible on the model surface viewed from point 15 through the grid 11, and these patterns look like contour lines appearing on the model surface. These lines are caused by the interference of the shadow pattern 18 cast onto the model and the optical pattern of the grid 11 through which the object 12 is viewed. Of course, the opaque lines 13 of the grid 11 and the lines of the shadow pattern 18, which are visible in the line of sight through the transparent lines 21 of the grid, are also seen at point 15.

If $H_i=H_c=H$, then it can be shown that the aforementioned contour lines, as seen at the point 15, result from alternate planes of brightness and darkness which are present in the object space (and which are cut by the surface contour of the object 12), that these planes of brightness and darkness are parallel to the grid 11, and that the spacing of such planes from the grid 11 is defined by the mathematical expression $$S_n = nPH/(L-nP) \qquad (1)$$

for the nth plane of brightness beneath the grid 11, where P equals the pitch of the grid 11, defined as the spacing between adjacent repetitive characteristics of the grid. The spatial frequency of the grid 11 thus is $1/P$.

The interference patterns occurring between the shadow pattern 18 and the pattern of the grid 11 are caused by the mixing of the spatial frequency of the shadow pattern 18, which is the shadow pattern cast by the grid 11 and spatially modulated by the surface contour of the object 12, and the spatial frequency $1/P$ of the grid 11. For the case of a sinusoidal grid pattern, the intensity $I_o$ of the image on the object 12 as seen by an observer at the point 15 is given by the following equation:

$$I_o = C\left[\frac{1}{2}\cos\frac{2\pi}{p}\left\{\frac{Ly}{L+y}\right\} - \frac{1}{2}\cos\frac{2\pi}{p}\left\{\frac{2Lx+Ly}{L+y}\right\} + \sin\frac{2\pi}{p}\left\{\frac{Lx}{L+y}\right\} + \sin\frac{2\pi}{p}\left\{\frac{Ly+Lx}{L+y}\right\} + 1\right] \qquad (2)$$

where x and y are respectively parallel to and perpendicular to the plane of the grid 11, as shown in FIG. 1, C is an illumination constant, and y is measured downwardly from the source 14.

Only the first variable term of equation (2) is dependent solely on y, which is perpendicular to the plane of the grid 11 and which represents the dimension of contour elevation. The other three variable terms of this equation are all dependent on some function of x and y combined. It can be seen, accordingly, that if the grid 11 is moved one cycle in the x direction, the second variable term of equation (2) is shifted two cycles and the third and fourth variable terms of the equation each is shifted one cycle; the first term of the equation, being independent of the x variable, remains unchanged. Shifting of the grid 11 one complete cycle in the x direction thus causes each of the x dependent terms of the observed image to be cancelled.

Accordingly, if the image at point 15 of the object 12 is viewed or photographed while the grid 11 is translated in the x direction one cycle, all variable elements of the observed intensity $I_o$ have an average intensity of zero except for the term which contains only contour information. An observer at point 15 would see on the object 12 only true contour lines representing the first variable term of equation (2) and would not see the gridlines, the shadow pattern 18, or the high-frequency noise components of the interference signals if the velocity of grid translation is sufficient for the perception of the observer to average the phase-shifted components of the observed signal. A time exposure taken at point 15 during a cycle of grid translation contains only contour information if the velocity of grid translation is sufficient to cause the x-variable terms to be averaged by the film emulsion.

FIG. 3 shows an example of apparatus for translating the grid 11 in the x direction. The grid 11 is mounted in a pair of parallel rails 24 and 25 and is connected through a thrust member 26 to a linear actuator 27. The linear actuator 27, which receives power from the motor 28, is a well-known mechanism which converts rotary input motion to linear output motion. Any suitable mechanism for translating the grid 11 could be substituted for the linear actuator 27 and the motor 28 so long as the grid 11 can be moved at a constant velocity along the rails 24 and 25.

Movement of the grid 11 along the guide rails causes the grid to pass momentarily through all phase positions of a grid cycle or period. Representative grid phase positions are shown in FIG. 2, wherein the 0° position shown in FIG. 2(a) is arbitrarily taken as the starting position with reference to equation (2) above. Movement of the grid 11 along the rails causes the grid lines 21 and 13 to pass through the 90°, 180°, and 270° positions to reach the 360° position, shifted in phase one cycle from the 0° position.

Although precise averaging of the grid, shadow, and high-frequency interference patterns to be cancelled requires that the grid 11 be moved an exact integral multiple of the grid period, it has been found in practice that moving the grid through at least five cycles of grid spacing reduces the effect of any additional portion of a cycle of grid travel to a level where such effect is no longer evident in the observed image at the observation point 15. In the operation of the FIG. 3 embodiment, for example, the motor 28 is started to translate the grid 11 at a constant velocity along the rails 24 and 25. The shutter of a camera at the observation point 15 is opened and remains open as the grid 11 moves at a constant velocity for a distance equal to at least five grid cycles. The shutter is then closed (assuming the film is adequately exposed) and the motor 28 is stopped. The photograph thus produced shows a picture of the object 12, such as the airplane model depicted, on which is superimposed a series of continuous bright and dark contour lines, each of which represents a line of uniform elevation in the y-direction measured with reference to the plane of the grid 11. Of course, these contour lines also can be seen by an observer at the point 15 during the time that the grid 11 is being translated. The translational velocity of the grid is not critical so long as the velocity is sufficient that observed flicker of the image or blurring of the photograph is eliminated or reduced to an acceptable level. A grid translational velocity of about 30 grid cycles per second is acceptable for direct observation of the contour image.

There are practical limitations to the size of the object which can be contour measured with the FIGS. 1 and 3 embodiments of the present invention because of the unwieldy grid 11 which would be required, for example, to measure the contour of a full-scale aircraft wing. These practical limitations of size attending the direct viewing technique are recognized in the copending application identified above, and that application teaches an alternative technique wherein the shadow grid pattern is projected onto the object to be contoured in substantially the same way in which a photographic slide is projected onto a screen. A photograph of the object including a projected shadow pattern similar to the shadow pattern 18 of FIG. 1 is taken at the observation point 15. The second grid required to produce the optical interference which yields the desired contour information may be provided by a transparent overlay member having a grid image identical to the grid image which would have been present at the focal plane of the camera had the shadow pattern been projected onto a screen at a predetermined reference plane in the object space to present a uniform image of the shadow grid. The transparent overlay grid member then is laid over the photograph and positioned to provide proper registration with the shadow grid pattern depicted on the photograph, at which time the contour pattern of the object can be seen on the photograph through the transparent overlay grid. Of course, the foregoing projection technique, as described more completely in the aforementioned copending application, yields a contour picture having the same undesired extraneous information described above with respect to the shadow grid technique.

An understanding of how the true contour techniques of the present invention can be applied to the projection contour-measuring techniques summarized above is best obtained by again considering the embodiment of FIGS. 1 and 3 herein. For any phase position of the grid 11 there is a phase position shifted exactly 180° having an image which, added to the first phase position, results in complete cancellation of the grid image since the intensity of the grid images at the 0° and 180° positions, for example, averages to zero intensity. For example, see FIGS. 2(a) and 2(c). Moreover, the shadow pattern cast by the grid also is cancelled by translating the grid 180° since the grid shadow is translated in phase synchronism with the motion of the grid.

Instead of moving the grid 11 at a uniform velocity while a true contour photograph is obtained as described above, it has been found that similar contour results can be obtained by taking four exposures on the same negative, if the grid 11 is held stationary during each exposure and is shifted 180 into position for each subsequent exposure. The four discrete grid positions can be obtained by a suitable mechanism for advancing the grid exactly one-quarter of a period, or the grid may be positioned manually if sufficiently accurate positional measurements can be obtained. The four photographed positions of the grid thus are 0°, 90°, 180°, and 270°, with the 0° position being arbitrarily chosen as the grid position at which the first exposure is taken. This four-position contour-photographing technique produces continuous contour detail with no extraneous grid shadow or noise information when used with a sinusoidal grid structure. If a square wave grid is used with the four-position system, the resultant photograph of the surface contour is virtually indistinguishable from the contour information obtained with a sinusoidal grid structure, although a theoretical evaluation of the observed image generated by the square wave grid structure indicates that there is a noise content present in the resultant image. A "square wave" grid, as the term is used herein, is a grid having an abrupt transition in transmissivity between each opaque line 13 and the adjacent transparent line 21, and a "sinusoidal" grid structure is one wherein the transmissivity of the grid varies sinusoidally from the completely opaque of each opaque line 13 to the completely transmissive of the adjacent transparent line 21.

The particular importance of the four-position technique described above is that, unlike the continuous grid movement concept of FIGS. 1 and 3, it can be applied in the projection contour technique. For example, four separate photographs taken at the observation point 15 can be made of an object having a shadow pattern projected thereon from a grid slide contained in a suitable projection system. The grid slide can be considered as being in the 0° position for the first photograph and the slide can be displaced exactly 90°, 180°, and 270° respectively, relative to such first position for the three subsequent photographs. A transparent overlay grid having a grid image identical to the camera focal plane image of the shadow pattern projected onto a reference plane by that grid slide position is prepared for each of the four grid slide positions. Each overlay grid must be precisely aligned with the respective photograph to produce the desired optical interference. A separate negative is made of each of the four photograph-overlay grid combinations, and these four negatives are used to produce a single composite photograph which contains the object with continuous contour lines thereon and with no extraneous optical noise.

While the four-photograph technique described above is workable, the alignment problems arising out of a grid slide which must be moved to four precisely controlled positions, along with the four photographs and the corresponding four overlay grids, make the four-picture technique costly and time consuming. In practice these problems can be substantially overcome, however, if it is realized that all information necessary to record the required four phase positions of the grid slide can be obtained with only two shadow pattern exposures and resultant photographs, the first taken at 0° phase and the second taken at a phase position displaced 90°. A negative made from the 0° photograph is the exact equivalent of a photographic positive made at 180° displacement, insofar as the shadow pattern 18 projected on the object 12 is concerned, if the grid slide is symmetrical, i.e., if the width of each opaque line is the same as the width of each transparent line. Similarly, a negative made of the 90° phase photograph is the exact equivalent of a photographic positive made at 270°. Photographs taken at each of the 0° and 90° positions, provide the four positions which can be photographically combined to yield contour information along with cancellation of extraneous noise information.

Figure 4:
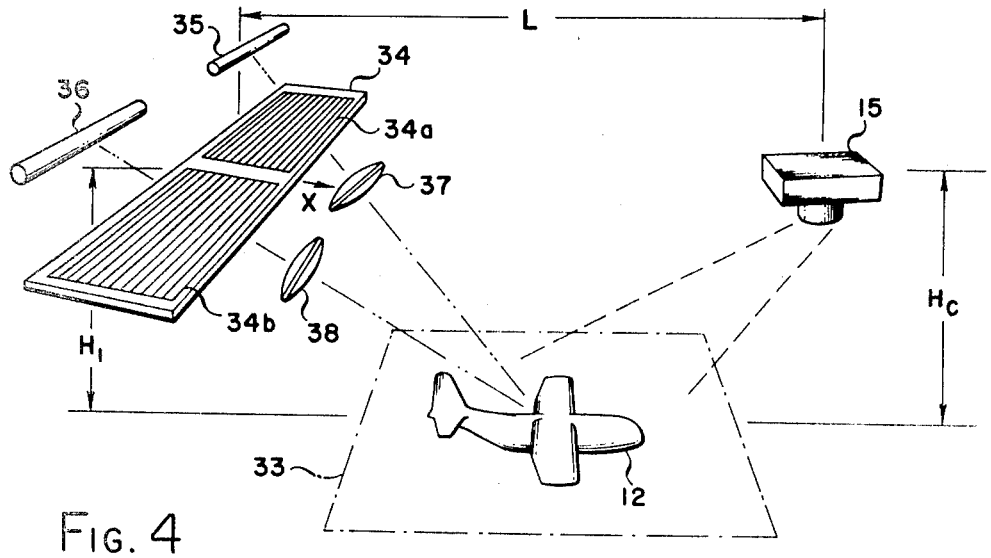
FIG. 4 shows a perspective view of another embodiment of the present invention.
Figure 5:
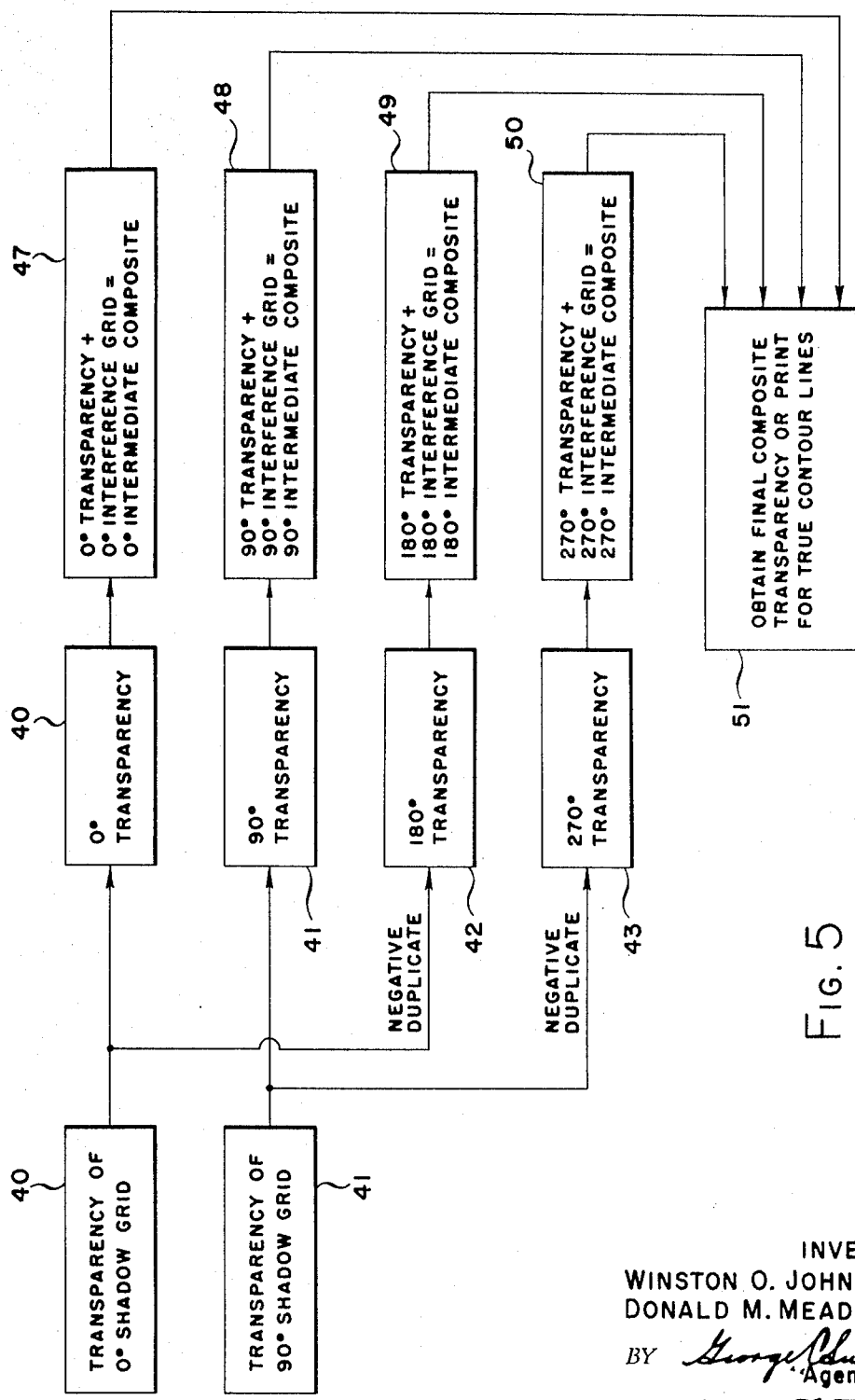
FIG. 5 is a flow chart illustrating the steps of the FIG. 4 embodiment.

The foregoing two-exposure technique can be implemented according to the embodiment of the present invention shown in FIGS. 4 and 5. An object 12 being examined for contour analysis is positioned with respect to a datum plane 33, which may be an imaginary plane in space or which can be a real surface such as a support table. The shadow pattern (not shown in FIG. 4) is cast onto the object 12 with an optical system including a composite slide 34, first and second illumination sources 35 and 36, and corresponding first and second projection lenses which schematically represent optical systems 37 and 38. The composite slide 34 contains two separate grid slides 34a and 34b which can be transparencies of symmetrical periodic shadow-casting structure such as alternate transparent and opaque gridlines. The grid slides 34a and 34b are identical one with the other with the exception that the grid slide 34a is displaced in phase exactly 90° along the x direction of the composite slide 34 with respect to the other grid slide 34b.

The composite projection system thus described is, in effect, two separate projection systems arranged with the grid slides 34a and 34b disposed on the composite slide 34 to insure accurate registry of the projected images of the grid slides. The optical systems 37 and 38 are positioned so that the grid images projected onto the datum plane 33 by the grid structure images 34a and 34b are in exact registry and are 90° out of phase with each other. A suitable camera having the nodal point of the camera lens disposed at the observation point 15 completes the apparatus shown in FIG. 4. Of course, for equation (1), given above, to be valid $H_f = C = H$ must be observed in the geometry of the FIG. 4 apparatus.

The operation of the two-photograph technique is now described with reference to FIG. 4 and the flow chart of FIG. 5. First, a photograph is made of the object 12 having a shadow pattern cast thereon by illumination projected through one of the grid slides, such as 34a. A second and separate photograph then is made using the shadow pattern cast by the grid slide 34b. The desired sequential selection of slides 34a and 34b can be accomplished by techniques, for example, such as sequential illumination of the sources 35 and 36, by sequentially actuated shutters contained in the two optical paths, or with a single illumination source combined with appropriate mirror reflector apparatus selectable to illuminate first one grid structure image and then the other such image. The photographs thus obtained constitute the 0° shadow grid transparency 40 and the 90° shadow grid transparency 41 of FIG. 5.

Each of the transparencies 40 and 41 is exactly duplicated as a photographic negative to provide the respective 180° transparency 42 and the 270° transparency 43, this being possible since the shadow pattern cast upon the datum plane, 33 and on the object 12 by the 0° grid structure 34a, for example, is optically identical to a negative made from a photograph of similar structure 180° out of phase.

The shadow patterns contained on each of the transparencies 40, 41, 42, and 43 must each be combined with a second grid structure to provide the optical interference necessary for generating the contour lines. The second grid structure for each of the four phase positions of the projection grid slide is a representation of the projection of the same grid slide onto a known flat surface, such as a surface contained in the datum plane 33, photographically recorded at the observation point 15. In actual practice the interference grid for the 0° and 90° phase positions corresponding with grid structure images 34a and 34b are prepared prior to the time that the FIG. 4 apparatus actually is used to project shadow grids onto a particular object 12, inasmuch as the interference grid transparencies for the 0° and 90° positions remain unchanged so long as the geometry of the FIG. 4 apparatus, including the particular composite slide 34, does not change. The interference grid transparencies for each of the 180° and 270° positions are obtained by making negative duplicates of the 0° and 90° interference grids, respectively.

Each of the four shadow grid transparencies 40–43 next is precisely aligned with its corresponding interference grid transparency. Accurate registry can be obtained by techniques known in the art, such as index marks superimposed on the various 0° and 90° shadow transparencies when the photographs are taken and on the interference transparencies when they are made, or such as registry pins and correspondingly positioned holes on the transparencies. An intermediate composite transparency then is made of the 0° transparency 40 as overlaid by the 0° interference grid transparency, this step being shown at 47 on FIG. 5. Intermediate composite transparencies are additionally made for the 90° 180°, and 270° shadow transparency-interference transparency overlay combinations as shown at 48, 49, and 50.

Each of the four intermediate composite transparencies, in addition to individually containing all of the available surface contour information of the object 12, also contains the unwanted extraneous information such as portions of the shadow lines (from the respective shadow grid transparencies), portions of the interference gridlines (from the respective interference grid transparencies), and the high-frequency interference patterns generated by optical pattern interference between the shadow grid pattern and the interference grid pattern. This unwanted optical information is substantially or completely cancelled by overlaying the four intermediate composite transparencies in precise registry and then making a final composite transparency as shown in 51. The resultant final composite transparency contains only continuous contour lines corresponding to the surface contour of the object 12 if sinusoidal grid structure images 34a and 34b have been used, since the steps described with reference to FIG. 5 represent equation (2) through one complete cycle of phase shift. Even if square wave grid structure images were used, the resultant final composite transparency and, of course, any prints made therefrom are found to be substantially completely free of any visible information extraneous to the contours being investigated.

It should be understood, of course, that the foregoing relates only to preferred embodiments of the invention and that numerous modifications or alterations may be made therein without departing from the spirit and the scope of the invention as set forth in the appended claims.

What is claimed is:

1. Surface-contour-measuring apparatus comprising:
   a source of illumination casting illumination diverging outwardly toward an object space in which a surface of an object to be examined may be positioned;
   shadow-casting structure disposed in the optical path of said diverging illumination between said source of illumination and said object space,
   said shadow-casting structure having a periodically repetitive pattern of segments which are alternatively opaque and transmissive with respect to illumination from said source and which cast a periodically repetitive shadow pattern having a certain spatial frequency of bright and dark regions toward the object space for impingement onto a surface positioned therein;
   optical interference means positioned to receive an image of said periodically repetitive pattern reflected from such surface,
   said optical interference means having a periodically repetitive pattern of segments having the same characteristics of alternate opacity and transmissivity as said segments of said shadow-casting structure to establish optical interference between the reflected image and the periodically repetitive pattern of said optical interference means; and
   means operatively interrelated with said shadow-casting structure and said optical interference means for selectively translating said shadow-casting structure and said optical interference means in phase synchronism with each other in a direction substantially parallel to the direction of said periodic repetition.

2. Apparatus as in claim 1 wherein:
   said shadow-casting structure and said optical interference means comprise a unitary grid member having a periodically repetitive pattern of segments and being mounted for translational movement in a direction substantially parallel to the direction of said periodic repetition;
   said selectively translating means comprising motive means operatively connected with said grid member for selectively imparting translational movement thereto.

3. Apparatus as in claim 2, wherein said motive means is operative to translate said grid member at a substantially constant velocity.

4. The method of measuring the contour of a surface, comprising the steps of:
   generating a pattern of illuminations having a first spatial frequency;
   directing said pattern of illumination onto a surface being examined so that the contour of the surface imparts spatial modulation to said first spatial frequency;
   optically mixing the spatially modulated first spatial frequency with a reference pattern having a second spatial frequency to establish an interference pattern of spatial frequency components including a modulation component which is a spatially variable function only of the surface contour which caused said spatial modulation; and
   spatially shifting the phase of said first and second spatial frequencies so that interference pattern components which are cyclically variable in the direction of and as a result of said spatial phase shift are averaged for said phase shifts.

5. The method as in claim 4, wherein said second spatial frequency is substantially equal to said first spatial frequency 6. The method as in claim 4, wherein the amount of said phase shift is sufficient to cause at least some of said cyclically variable interference patterns to undergo at least one cycle of variation.

7. The method as in claim 4, wherein said phase shift occurs at a substantially uniform rate.

8. The method as in claim 4, wherein said first and second spatial frequencies are shifted in phase by one cycle.

9. The method as in claim 8, wherein said step of phase shifting comprises:
   spatially shifting the phase of said first and second spatial frequencies to each of a plurality of fixed phase positions spaced equidistant throughout a spatial frequency cycle; and
   combining the interference patterns present at each of said fixed phase positions to produce a composite interference pattern which is a summation of the fixed phase position interference patterns.

10. The method as in claim 7, wherein said rate of phase shift is sufficiently great that the instantaneous intensity of the interference pattern components which are cyclically varied by said phase shift is perceptably integrated to the average value of such cyclically varied components.

11. The method as in claim 4, wherein said steps of mixing and phase shifting comprise:
pictorially recording the spatially modulated first spatial frequency at a number of predetermined discrete phase shift positions in a cycle of said first spatial frequency;
mixing the image of each such pictorial record with the image of said reference pattern shifted in phase to the one of said discrete phase shift positions whereat the corresponding pictorial record was made to establish said interference pattern of spatial frequency components for each of said discrete phase shift positions; and
adding together said discrete phase position interference patterns for said spatial frequency cycle so that interference pattern components which are cyclically variable in the direction of spatial phase shift have an average value for said phase shift cycle.

12. The method as in claim 11, wherein the spatial phase separation between each of said phase shift positions is uniform.

13. The method as in claim 11, wherein said step of pictorially recording comprises:
preparing a first pictorial record of the spatially modulated first spatial frequency at a first spatial phase position;
preparing a second pictorial record of the spatially modulated first spatial frequency at a second phase position spatially displaced 90° in a predetermined direction from said first phase position;
preparing a third pictorial record by making a negative duplicate of said first pictorial record;
preparing a fourth pictorial record by making a negative duplicate of said second pictorial record;
mixing the spatial frequency on said first record with an image of said reference pattern which is in phase with said first spatial position to establish said interference pattern for the first spatial position;
mixing the spatial frequency on said second record with an image of said reference pattern which is spatially displaced 90° in said predetermined direction from said first phase position to establish said interference pattern for the second spatial position;
mixing the spatial frequency on said third record with an image of said reference pattern which is spatially displaced 180° in said predetermined direction from said first phase position to establish said interference pattern for the third position;
mixing the spatial frequency on said fourth record with an image of said reference pattern which is spatially displaced 270° in said predetermined direction from aid first phase position to establish said interference pattern for the fourth position; and
adding together all of said spatial position interference patterns for the cycle of spatial frequency so that interference pattern components which are cyclically variable in the direction of spatial phase shift have an average value.

14. The method of measuring the contour of a surface comprising the steps of:
applying a pattern of periodically repetitive illumination to the surface being examined to establish on such surface a pattern of said illumination which is spatially displaced by the contour of the surface;
reflecting said pattern of spatially displaced illumination from the surface toward an observation location;
passing the reflected illumination pattern through a periodically repetitive viewing structure which alternately blocks and permits the passage of the reflected illumination to establish a pattern of optical interference between said reflected pattern and said viewing structure so that said interference pattern contains surface contour information resulting from said spatial displacement of said supplied pattern of illumination and
shifting both said pattern of periodically repetitive illumination and said periodically repetitive viewing structure at least one repetitive period in the direction of pattern repetition to cancel at least some of the portions of said interference pattern not containing surface contour information resulting from said spatial displacement of said applied pattern of illumination.

15. The method as in claim 14, wherein said shift of both said patterns is substantially an integral number of repetitive periods in the direction of pattern repetition.

16. The method as in claim 14, wherein said shift of both said patterns takes place at a rate of shift sufficiently great that the instantaneous intensity of the portions of said interference pattern which are affected by said shift is perceptually integrated to the average value of such shift-affected portions.

17. The method as in claim 14, wherein said step of shifting comprises:
shifting both said pattern of periodically repetitive illumination and said viewing structure to each of a plurality of fixed positions spaced equidistant throughout said repetitive pattern; and
combining the interference pattern present at each of said fixed positions to produce a composite interference pattern which is a summation of the fixed position interference patterns.

* * * * *